United States Patent [19]

Lin

[11] Patent Number: 5,488,881
[45] Date of Patent: Feb. 6, 1996

[54] MECHANICAL TRANSMISSION MECHANISM WITH ROLLING MEANS

[76] Inventor: Hung-Chung Lin, No. 8, Lane 255, Lai-Nan St., Kaohsiung City, Taiwan

[21] Appl. No.: 278,837

[22] Filed: Jul. 22, 1994

[51] Int. Cl.$^6$ ..................................... F16C 1/28
[52] U.S. Cl. ................. 74/502.3; 49/349; 49/352; 74/505; 74/506; 403/57; 403/58; 464/178; 474/203; 474/211
[58] Field of Search ............... 74/502.3, 502.5, 74/505.506; 474/203, 211; 403/57, 58, 53; 464/178; 49/349, 352, 362, 324

[56] References Cited

U.S. PATENT DOCUMENTS

| | | | |
|---|---|---|---|
| 551,811 | 12/1895 | Curtis | 474/203 X |
| 579,237 | 3/1897 | Kotin | 474/203 |
| 1,807,914 | 6/1931 | Hopkins | 74/502.3 |
| 2,869,377 | 1/1959 | Pieterse | 74/502.3 |
| 3,436,130 | 4/1969 | Grebert | 74/502.3 |
| 3,965,802 | 6/1976 | Jacobs | 74/502.3 X |
| 3,990,321 | 11/1976 | Hurlow | 74/502.3 |
| 4,656,780 | 4/1987 | Miyauchi et al. | 49/352 X |
| 4,707,017 | 11/1987 | Minobe et al. | 49/352 X |
| 4,744,172 | 5/1988 | Miyauchi | 49/349 |
| 5,159,849 | 11/1992 | Womach | 403/57 X |

FOREIGN PATENT DOCUMENTS

| | | | |
|---|---|---|---|
| 403842 | 5/1943 | Italy | 74/502.3 |
| 1070413 | 1/1984 | U.S.S.R. | 49/324 |
| 219506 | 7/1924 | United Kingdom | 74/502.3 |

Primary Examiner—Vinh T. Luong
Attorney, Agent, or Firm—Pravel, Hewitt, Kimball & Krieger

[57] ABSTRACT

A mechanical transmission mechanism with rolling unit includes an input member, an output member and a transmission medium for transmitting a mechanical input. The input member includes a driving gear which is enveloped in a casing with a peripheral channel that is confined between a partial circumference of the driving gear and an inner face of the casing. The casing has two openings formed on both ends of the peripheral channel and connected respectively and tangentially to a pair of guide channels so as to form a guide path that extends between the input and output members. The transmission medium is a plurality of rolling bodies which are packed in the guide path and which are disposed alternatingly in juxtaposed lines along the guide path. Each of the rolling bodies is in rolling contact with adjacent rolling bodies. A line of rolling bodies matches the driving gear to enable each of the rolling bodies in the line to move rollingly along the guide path to drive rollingly the rolling bodies of an adjacent line and thus drive the output member when the driving gear is in operation.

7 Claims, 4 Drawing Sheets

MECHANICAL TRANSMISSION MECHANISM WITH ROLLING MEANS

BACKGROUND OF THE INVENTION

1. Field of the Invention

The invention relates to a mechanical transmission mechanism, more particularly to a mechanical transmission mechanism with rolling means which generates less friction loss when compared to a conventional mechanical transmission mechanism with balls that serves as a transmission medium so as to perform a work effectively.

2. Description of the Related Art

Referring to FIG. 1, a conventional mechanical transmission mechanism with balls that serve as a transmission medium is shown to comprise an input member 32, an output member 31 and a transmission medium 34 for transmitting a mechanical input which is received from the input member 32 in order to enable the output member 31 to perform work. As illustrated, the output and input members 31, 32 are in the form of pistons which are respectively and slidably inserted into two ends of a guide channel 30 while a row of successive balls are packed in the guide channel 30 and serve as the transmission medium 34. A compression spring 310 is sleeved around the output member 31 to bias the latter to return to its initial position after work has been performed. The input member 32 is connected to one end of a crank 33 which is driven by a rotary machine (not shown). The crank member 33 swings upon receipt of a driving force from the rotary machine, and the applied force is received by the input member 32 and is transmitted to the output member 31 via the transmission medium 34 in order to perform work.

In order to provide a uniform and even transmission force, the balls are in sliding contact with the inner surface of the guide channel 30. Each of the balls moves without rotating and transmits the applied force to a succeeding ball. Movement of the balls along the guide channel 30 generates friction which impedes and decreases the effectiveness of the driving force upon reaching the output member 31.

SUMMARY OF THE INVENTION

The main object of the present invention is to provide a mechanical transmission mechanism with rolling means which generates less friction when compared to the conventional mechanical transmission mechanism which employ sliding balls as the transmission medium.

Accordingly, the mechanical transmission mechanism with rolling means of the present invention includes an input member, an output member and a transmission medium for transmitting a mechanical input which is received by the input member in order to enable the output member to perform. The input member comprises a driving gear which is enveloped in a casing with a peripheral channel that is confined between a partial circumference of the driving gear and an inner face of the casing. The casing has two openings which are formed on both ends of the peripheral channel and which are connected respectively and tangentially to a pair of guide channels so as to form a guide path which extends from the input member to the output member via the peripheral channel and the pair of guide channels. The transmission medium is packed in the guide path and constituted by a plurality of rolling bodies which are disposed alternately in juxtaposed lines that extend respectively along the guide path. Each of the rolling bodies is in contact with adjacent rolling bodies of a neighboring line. One of the lines of rolling bodies matches the driving gear to enable the rolling bodies to move rollingly along the guide path and drive the output member when the driving gear is operated. The input member can be a roller gear or a gear disc, the output member can be a follower gear, such as a gear disc or a roller gear or a pair of follower pistons, while the rolling bodies can be a plurality of roller balls or cylindrical bodies.

In one preferred embodiment, the input member is a gear disc, and the output member is preferably a gear disc which is also enveloped in a second casing with a second peripheral channel that is confined between a partial circumference of the gear disc and an inner face of the second casing. The second casing has two openings which are formed on both ends of the second peripheral channel and which are connected respectively and tangentially with two ends of the pair of guide channels so as to form an endless guide path which extends between the input member and the output member via the peripheral channels and the pair of guide channels.

In another preferred embodiment, the input member is a gear disc which has the same configuration as that of the previous embodiment, while the output member is a pair of piston rods respectively and slidably sleeved in the pair of guide channels. The gear disc is adapted to be rotated reciprocatingly in order to drive the piston rods.

Since the rolling bodies are pushed in the guide path and each of the rolling bodies in neighboring lines contacts rollingly adjacent rolling bodies, and since the rolling bodies rotate about the respective axis while moving along the guide path, the friction that is generated among the rolling bodies is considerably less than that generated in the conventional mechanical transmission mechanism which uses sliding balls as the transmission medium.

BRIEF DESCRIPTION OF THE DRAWINGS

Other features and advantages of the present invention will become more apparent in the following detailed description of the preferred embodiments with reference to the accompanying drawings, in which.

DETAILED DESCRIPTION OF THE PREFERRED EMBODIMENTS

Figure 1:
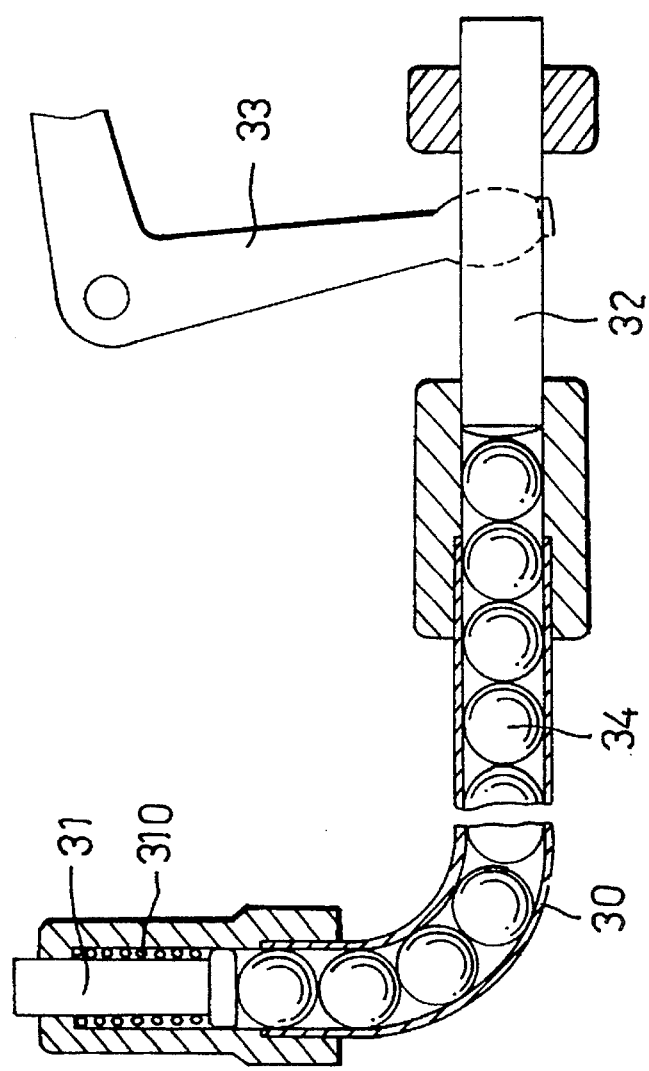
FIG. 1 shows a conventional mechanical transmission mechanism which uses a plurality of sliding balls as a transmission medium.
Figure 2:
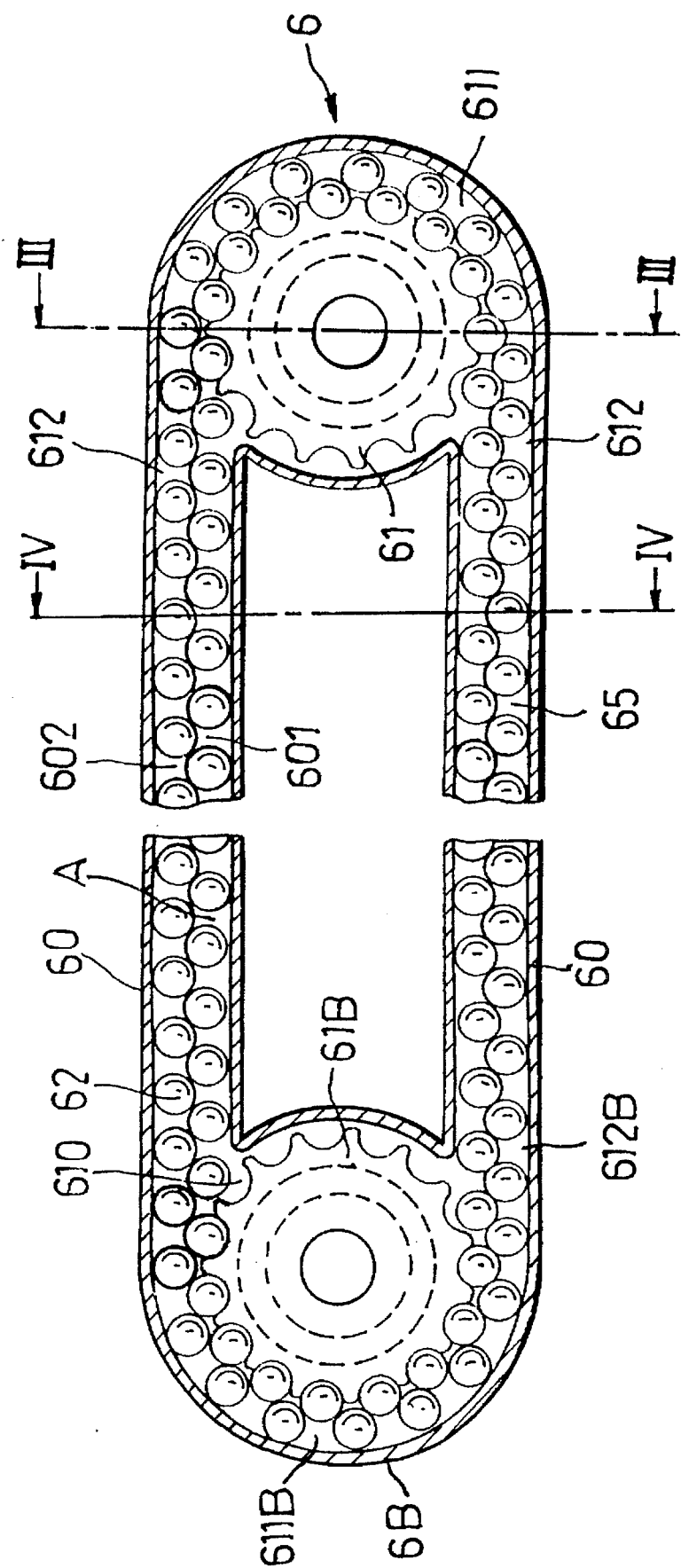
FIG. 2 shows a first preferred embodiment of a mechanical transmission mechanism with rolling means of the present invention.

Referring to FIG. 2, a first preferred embodiment of a mechanical transmission mechanism with rolling means of the present invention is shown to comprise an input member, such as a driving gear 61, an output member in the form of a follower gear 61B, and a transmission medium in the form of a plurality of rolling bodies 62 for transmitting a mechanical input which is received by the input member in order to enable the output member to perform work.

Figure 4:
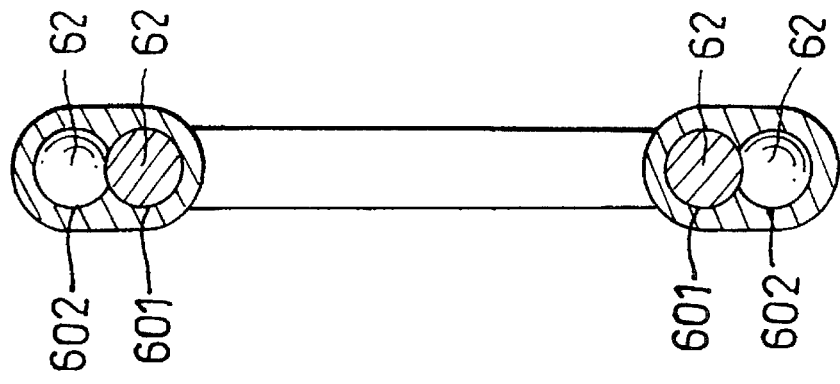
FIG. 4 shows a cross sectional view of the first preferred embodiment of the present invention, taken along the line IV—IV in FIG. 2.
Figure 3:
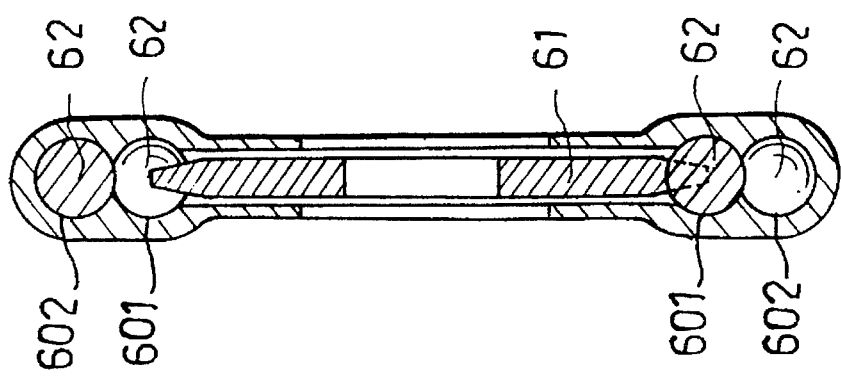
FIG. 3 shows a cross sectional view of the first preferred embodiment of the present invention, taken along the III—III in FIG. 2.

As illustrated, the driving gear 61 is enveloped in a casing 6 with a peripheral channel 611 that is confined between a partial circumference of the driving gear 61 and an inner face of the casing 6. The casing 6 has two openings 612 formed on both ends of the peripheral channel 611 and connected respectively and tangentially to two ends of a pair of guide channels 60. Note that in the first preferred embodiment, the driving gear 61 and the follower roller 61B are gear discs which have the same configuration as that shown in FIG. 3. The follower gear 61B is enveloped in a second casing 6B with a second peripheral channel 611B that is confined between a partial circumference of the follower gear 61B and an inner face of the second casing 6B. The second casing 6B has two openings 612B formed on both ends of the peripheral channel 611B and connected respectively and tangentially with another two ends of the pair of guide channels 60 so that a guide path 65 is formed between the driving gear 61 and the follower gear 61B. The guide path 65 in the first preferred embodiment is an endless guide path, which extends around the input and output members via the peripheral channels 611, 611B, and the guide channels 60. As shown in FIGS. 3 and 4, the rolling bodies 62 in this embodiment are roller balls which are disposed alternatingly in juxtaposed lines 601, 602 that extend respectively along the guide path 65. Each of the rolling bodies 62 is in rolling contact with adjacent rolling bodies 62 in neighboring lines. Note that the adjacent rolling bodies 62 in each of the lines 601, 602 are spaced at equal interval "A" as shown in FIG. 2. Each of the rolling bodies 62 in lines 601 and 602 partially contacts a wall body that confines the endless guide path 65 and engages rollingly with adjacent two of the rolling bodies 62. The rolling bodies 62 of the line 601 matched the driving gear 61 and the follower gear 61B such that the teeth of driving gear 61 and the follower gear 61B extend in the spaces "A" to engage the rolling bodies 62. Thus, when the driving gear 61 is driven to operate, the rolling bodies 62 of the line 601, which mesh with the driving gear 61 move rollingly along the guide path 65 to drive rollingly the rolling bodies 62 of the line 602 and to drive correspondingly the follower gear 61B. A shaft (not shown) can be mounted securely to the center of the follower gear 61B. Thus, the shaft can consequently drive a roller which is mounted securely thereon. If an abrasive belt is stretched over the roller by the use of another follower roller, rotation of the abrasive belt can abrade an article to enhance its appearance.

The teeth along the peripheral edges of the driving gear 61 and the follower gear 61B can be constructed to have a pitch 610 which is adapted to receive one-half of each of the rolling bodies 62 which mesh therewith.

Figure 5:
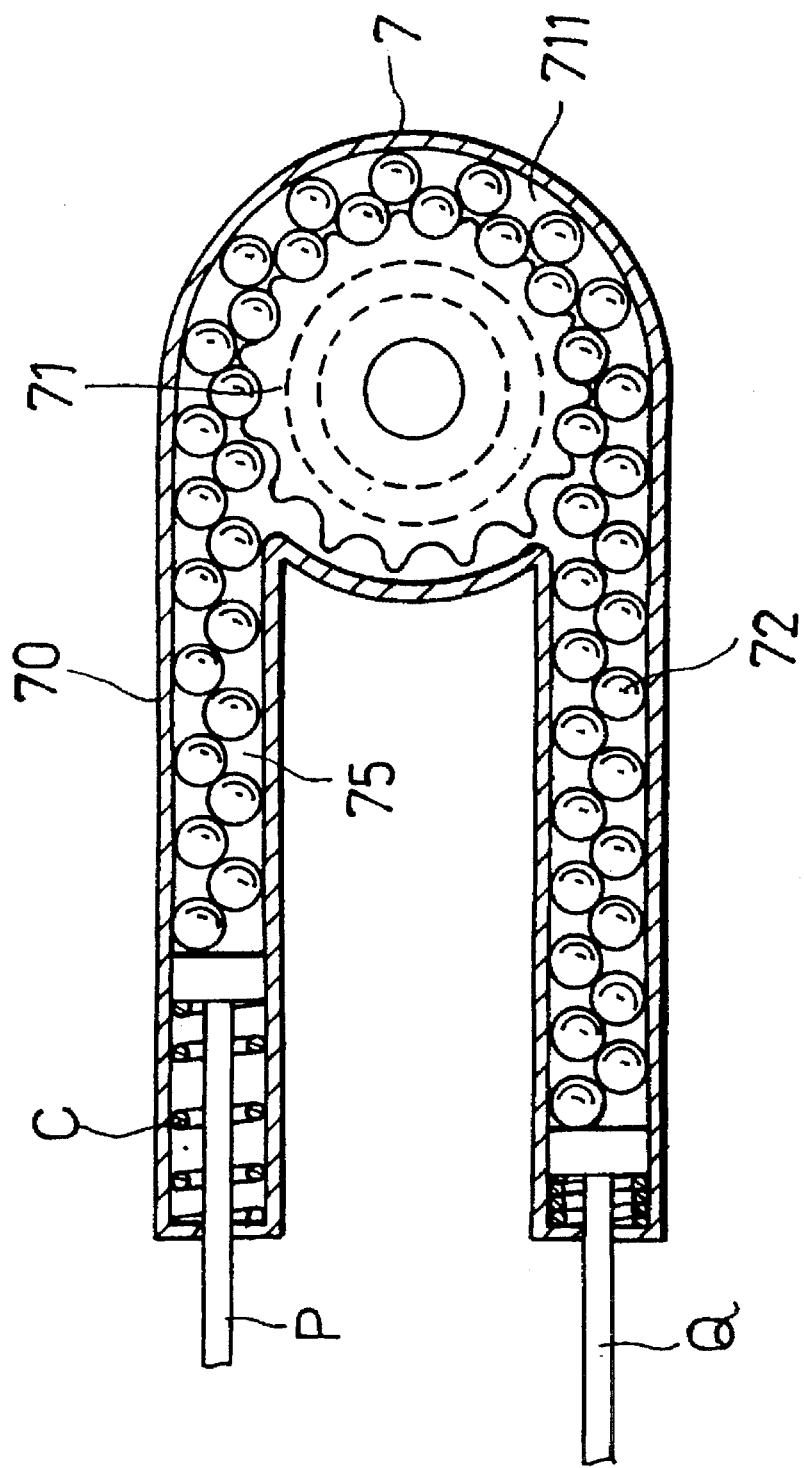
FIG. 5 shows a second preferred embodiment of the present invention.

Referring to FIG. 5, in a second preferred embodiment, the input member is a driving gear 71 which has the configuration as that of the first preferred embodiment, except that the output member is a pair of pistons p, Q respectively and slidably inserted into the pair of guide channels 70 which are connected respectively and tangentially to two ends of the peripheral channel 711 of a casing 7 which envelops the driving gear 71. Thus a U-shaped guide path 75 is formed between the pair of pistons P, Q and the driving gear 71. The transmission medium is a plurality of roller balls 72 provided in the guide path 75 in a manner similar that of the first embodiment. Thus, the driving gear 71 can be driven reciprocatingly in order to drive the pistons P, Q to and fro. Note that the pistons P, Q are provided with a respective compression spring C which compresses back to return the pistons P, Q to their initial positions after the performance of work.

Since each of the rolling bodies 62 rotate about the respective axis and are in rolling contact with adjacent roller balls of neighboring lines while moving along the guide path, the friction that is generated among the rolling bodies is considerably less when compared to that of the conventional mechanical transmission mechanism which uses sliding balls as the transmission medium. The feature and objective of this invention are thus achieved.

While preferred embodiments have been described and explained, it will be apparent that many changes and modifications can be made in the general construction and arrangement without departing from the scope and spirit thereof. It is therefore desired that the present invention be not limited to the exact disclosure but only to the extent of the appended claims.

I claim:

1. A mechanical transmission mechanism including an input member, an output member and a transmission medium for transmitting a mechanical input which is received by said input member in order to enable said output member to perform work, wherein said input member comprises a driving gear enveloped in a casing with a peripheral channel confined between a partial circumference of said driving gear and an inner face of said casing, said casing having two openings formed on both ends of said peripheral channel and connected respectively and tangentially to a pair of guide channels so as to form a guide path extending from said input member to said output member via said peripheral channel and said pair of guide channels, and wherein said transmission medium is packed in said guide path and is constituted by a plurality of rolling bodies which are disposed alternatingly in juxtaposed lines that extend respectively along said guide path, each of said rolling bodies being in contact with adjacent rolling bodies in neighboring lines, one of said lines of rolling bodies matching said driving gear and enabling said rolling bodies to move rollingly along said guide path to drive said output member when said driving gear is operated.

2. The mechanical transmission mechanism as defined in claim 1, wherein said output member is constituted by a follower gear enveloped in a second casing with a second peripheral channel confined between a partial circumference of said follower gear and an inner face of said second casing, said second casing having two openings formed on both ends of said second peripheral channel and connected respectively and tangentially to said guide channels so as to communicate with said guide path.

3. The mechanical transmission mechanism as defined in claim 1, wherein said output member comprises a pair of piston rods sleeved respectively and slidably in said pair of guide channels, said driving gear being adapted to be rotated reciprocatingly.

4. The mechanical transmission mechanism as defined in claim 1, wherein said driving gear is a gear disc.

5. The mechanical transmission mechanism as defined in claim 2, wherein said driving gear and said follower gear are gear discs.

6. The mechanical transmission mechanism as defined in claim 1, wherein said rolling bodies are ball-shaped bodies.

7. The mechanical transmission mechanism as claimed in claim 5, wherein said rolling bodies are ball-shaped bodies.

* * * * *